United States Patent
Asplund et al.

(10) Patent No.: US 8,942,766 B2
(45) Date of Patent: Jan. 27, 2015

(54) ARRANGEMENT FOR IMPROVED ISOLATION BETWEEN ADJACENT CELL AREAS

(75) Inventors: Henrik Asplund, Stockholm (SE); Bo Hagerman, Tyresö (SE); Arne Simonsson, Gammelstad (SE)

(73) Assignee: Optis Cellular Technology, LLC, Plano, TX (US)

( * ) Notice: Subject to any disclaimer, the term of this patent is extended or adjusted under 35 U.S.C. 154(b) by 1005 days.

(21) Appl. No.: 13/061,218

(22) PCT Filed: Aug. 28, 2008

(86) PCT No.: PCT/EP2008/061342
§ 371 (c)(1),
(2), (4) Date: Feb. 28, 2011

(87) PCT Pub. No.: WO2010/022783
PCT Pub. Date: Mar. 4, 2010

(65) Prior Publication Data
US 2011/0169713 A1    Jul. 14, 2011

(51) Int. Cl.
*H04M 1/00* (2006.01)
*H04B 7/10* (2006.01)
*H01Q 1/24* (2006.01)
*H01Q 21/20* (2006.01)
*H04B 7/04* (2006.01)

(52) U.S. Cl.
CPC ............... *H04B 7/10* (2013.01); *H01Q 1/246* (2013.01); *H01Q 21/205* (2013.01); *H04B 7/0491* (2013.01)
USPC ................... 455/562.1; 455/63.1; 455/67.13; 455/561; 343/893

(58) Field of Classification Search
CPC ......... H01Q 1/246; H04B 7/10; H04B 7/0491
USPC ............ 455/561, 562.1, 63.1, 67.13; 343/893
See application file for complete search history.

(56) References Cited

U.S. PATENT DOCUMENTS

| 3,384,890 A | 5/1968 | List et al. |
| 4,899,165 A | 2/1990 | Schadler |

(Continued)

FOREIGN PATENT DOCUMENTS

| JP | 11284433 A | 10/1999 |
| JP | 2006504301 A | 2/2006 |
| JP | 2008/503152 | 1/2008 |

OTHER PUBLICATIONS

International Search Report, Application No. PCT/EP2008/061342, Jul. 5, 2009.

*Primary Examiner* — Raymond Dean
(74) *Attorney, Agent, or Firm* — Vincent J. Allen; James H. Ortega; Carstens & Cahoon, LLP

(57) ABSTRACT

The present invention relates to a node in a wireless communication system, the node having a central point and comprising at least two antenna functions. Each antenna function is arranged to cover a corresponding sector area, the sector areas being positioned around the central point successively such that each sector area is adjacent to at least one other sector area separated by corresponding borders. The polarization of at least one of said antenna functions is variable between the borders of the corresponding sector area such that for each border, the polarizations of the antenna functions at each side of the border are essentially orthogonal at the border. The present invention also relates to a corresponding wireless communication system and corresponding antenna functions.

14 Claims, 3 Drawing Sheets

(56) References Cited

U.S. PATENT DOCUMENTS

| | | |
|---|---|---|
| 6,341,223 B1 | 1/2002 | Park |
| 6,553,239 B1 | 4/2003 | Langston |
| 7,242,350 B1 | 7/2007 | Pozgay |
| 7,277,731 B2 * | 10/2007 | Stratis et al. ............... 455/562.1 |
| 7,991,408 B2 * | 8/2011 | Paulson et al. ............. 455/456.3 |
| 8,432,329 B2 * | 4/2013 | Johansson et al. ............ 343/893 |
| 2008/0119197 A1 | 5/2008 | Skarby |

* cited by examiner

ARRANGEMENT FOR IMPROVED ISOLATION BETWEEN ADJACENT CELL AREAS

TECHNICAL FIELD

The present invention relates to a node in a wireless communication system, the node having a central point and comprising at least two antenna functions. Each antenna function is arranged to cover a corresponding sector area, the sector areas being positioned around the central point successively such that each sector area is adjacent to at least one other sector area. Two adjacent sector areas are separated by at least one corresponding border extending from the central point and running between the corresponding antenna functions.

The present invention also relates to a corresponding wireless communication system.

The present invention also relates to an antenna function in a wireless communication system. The antenna function is arranged to cover a corresponding sector area having at least two borders towards at least one other adjacent sector area, where the adjacent sector area has a corresponding antenna function.

BACKGROUND

In cellular systems for wireless communication, base stations of different kinds are normally used. A typical base station (BS) in a cellular system is often deployed above roof-top level or in a high mast, increasing its coverage area. In the mast, there are normally a number of antenna units, single polarized or double polarized, that each provides sector coverage for a certain cell area or sector area. Typically, three antenna units are placed equidistantly around the circumference of the mast, such that each antenna unit covers a 120° sector, thus these antenna units have three corresponding successive sector areas.

It is of interest to attain isolation between such neighboring sector areas.

Antenna polarization can be utilized to provide isolation between signals transmitted or received in such neighboring sector areas in a wireless cellular communication system. By ensuring that transmitters in neighboring sector areas have orthogonal polarizations, it is possible to improve the isolation between the signals in a receiver, resulting in less interference between the cells.

However, the number of antenna polarizations to choose from is limited. Typically, there are only two orthogonal choices possible for a sector-covering or omni-directional base station antenna. This severely limits the usefulness of the antenna polarization as a means for improved isolation or coverage as outlined above. The typical cellular site being equipped with three sector-covering antennas as described above makes it impossible to choose antennas such that all three are orthogonal towards each other.

Additionally, each cell can have multiple neighboring cells where the mutual interference among these can not be adequately suppressed with the degrees of freedom of only two polarizations.

There is thus a need for a base station antenna arrangement, where the isolation between the cell areas or sector areas that are covered by a certain base station is improved.

SUMMARY

The object of the present invention is to provide an antenna arrangement, where the isolation between the cell areas or sector areas that are covered by a certain base station is improved.

The object of the present invention is also to provide a node in a wireless communication system, which node comprises an antenna arrangement, where the isolation between the cell areas or sector areas that are covered by the node is improved.

Said object is achieved by means of a node in a wireless communication system, the node having a central point and comprising at least two antenna functions. Each antenna function is arranged to cover a corresponding sector area, the sector areas being positioned around the central point successively such that each sector area is adjacent to at least one other sector area. Two adjacent sector areas are separated by at least one corresponding border extending from the central point and running between the corresponding antenna functions. The polarization of at least one of said antenna functions is variable between the borders of the corresponding sector area such that for each border, the polarizations of the antenna functions at each side of the border are essentially orthogonal at the border.

Said object is also achieved by means of a corresponding wireless communication system.

According to one embodiment example, the node comprises an odd number of sector areas, for example the node comprises a first antenna function, second antenna function and third antenna function, where each antenna function is arranged to cover a corresponding first sector area, second sector area and third sector area.

According to one special aspect of the present invention, a user terminal in one sector area is equipped with means for determining its angular position within the sector area by measuring and evaluating the polarization of the signals received from said node, the angular position being defined within an angular interval between the corresponding borders, and having a certain accuracy.

The present invention also relates to an antenna function in a wireless communication system. The antenna function is arranged to cover a corresponding sector area having at least two borders towards at least one other adjacent sector area, where the adjacent sector area has a corresponding antenna function. The polarization of the antenna function is variable between said borders such that along each border, the polarization of the antenna function is essentially orthogonal to the polarization in the corresponding adjacent sector area.

According to one embodiment example, the polarization of each antenna function is continuously variable between the borders of the corresponding sector area, such that the polarization for each antenna function varies essentially equally from one border to the other in the corresponding sector area.

According to another embodiment example, each antenna function with a continuously variable polarization comprises a first element with a first polarization vector and a second element with a second polarization vector, the polarization vectors presenting an angle between them, where the elements radiate essentially equal radiation patterns, the elements being separated by a distance. In an alternative embodiment, the elements radiate unequal radiation patterns.

A number of advantages are obtained by means of the present invention. For example:

An improved isolation is achieved for any number of sector areas.

Admitting arbitrary sectorization.

BRIEF DESCRIPTION OF THE DRAWINGS

The present invention will now be described more in detail with reference to the appended drawings, where.

DETAILED DESCRIPTION

Figure 1:
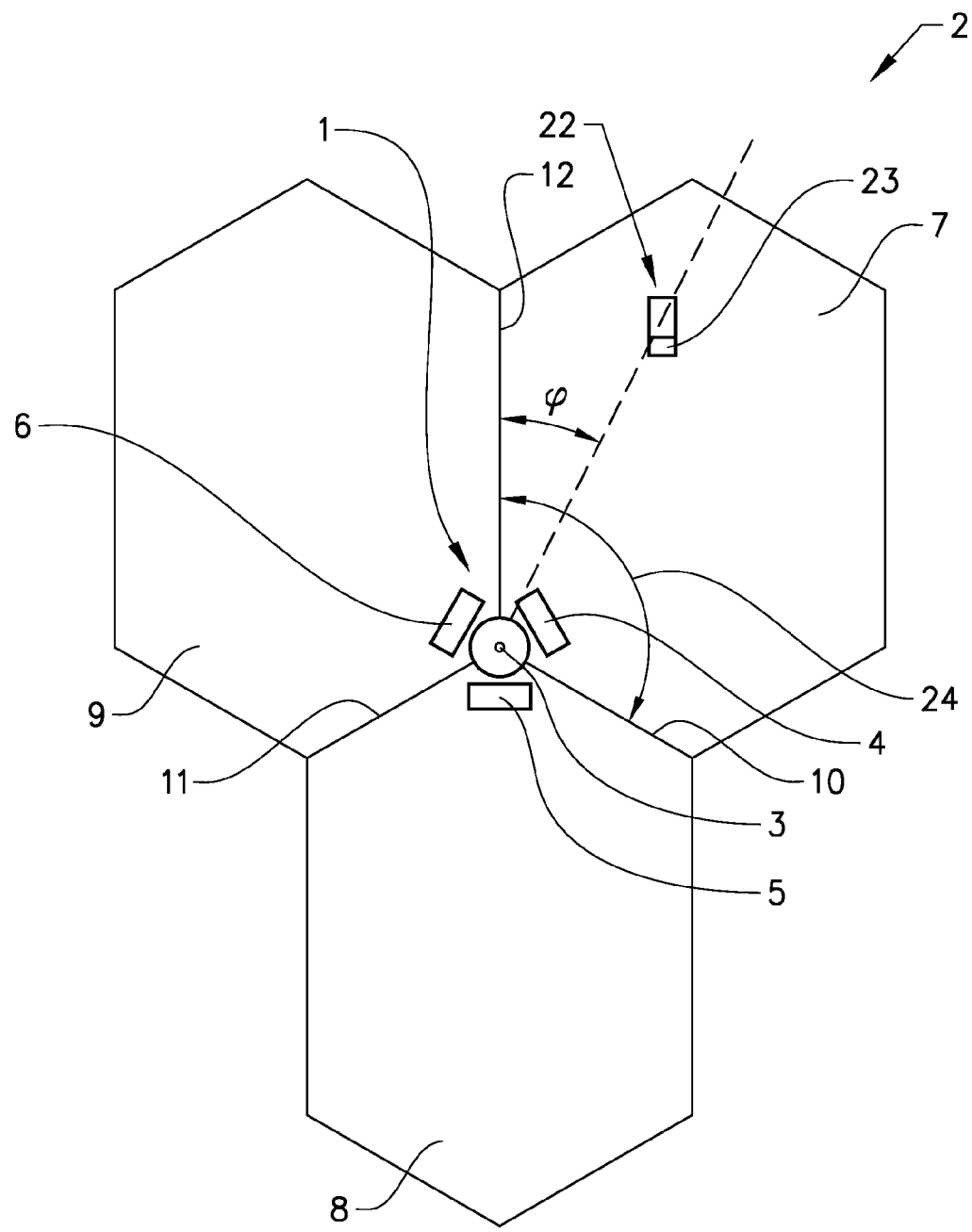
FIG. 1 shows a simplified view of a base station and a user terminal.

In FIG. 1, there is shown a base station 1 in a wireless communication system 2, where the base station 1 has a central point 3 and comprises at least a first antenna 4, a second antenna 5 and a third antenna 6. The central point is constituted by a mast on which the antennas 4, 5, 6 are mounted successively and equidistantly around its circumference, such that each antenna 4, 5, 6 is arranged to cover a 120° sector.

The first antenna 4 is arranged to cover a corresponding first sector area 7, the second antenna 5 is arranged to cover a corresponding second sector area 8 and the third antenna 6 is arranged to cover a corresponding third sector area 9. The sector areas 7, 8, 9 constitute cells in a wireless communication environment. Although the term "area" is used, a user moves on the area but in a corresponding volume. When the term "area" is used, the corresponding volume is also aimed at where applicable.

The first sector area 7 and the second sector area 8 are adjacent and separated by a first border 10 which extends from the central point 3 and runs between the first antenna 4 and the second antenna 5. The second sector area 8 and the third sector area 9 are adjacent and separated by a second border 11 which extends from the central point 3 and runs between the second antenna 5 and the third antenna 6. The third sector area 9 and the first sector area 7 are adjacent and separated by a third border 12 which extends from the central point 3 and runs between the third antenna 6 and the first antenna 4.

In order to achieve the essentially orthogonal polarizations along the borders, at least the second antenna 5 has a polarization that is different in different directions, the polarization being a function of transmission direction. Only the second antenna 5 has a polarization that is different in different directions in the case where the first polarization p1 and the third polarization p3 are essentially orthogonal.

According to the present invention, at least one antenna is arranged to present polarizations that are different for different azimuth coverage angles, such that the polarizations of the antenna functions 4, 5, 6 at each side of each corresponding border 10, 11, 12, are essentially orthogonal at the border.

In other words, at the first border 10, the first antenna 4 is arranged to have a polarization that is essentially orthogonal to the polarization of the second antenna 5. In the same way, at the second border 11, the second antenna 5 is arranged to have a polarization that is essentially orthogonal to the polarization of the third antenna 6, and at the third border 12, the third antenna 6 is arranged to have a polarization that is essentially orthogonal to the polarization of the first antenna 4.

This is made possible by using single-polarized antennas that have varying polarizations over the azimuth directions associated with the corresponding sector area.

The variations may be devised such that each sector-covering antenna has orthogonal polarizations on its right and left sector borders. However, this is not necessary; the main feature is that the antennas of neighboring sectors have essentially orthogonal polarizations at the border between these sectors.

In the following, a description of how antennas that have varying polarizations over the azimuth directions may be devised, is provided.

Figure 2A:
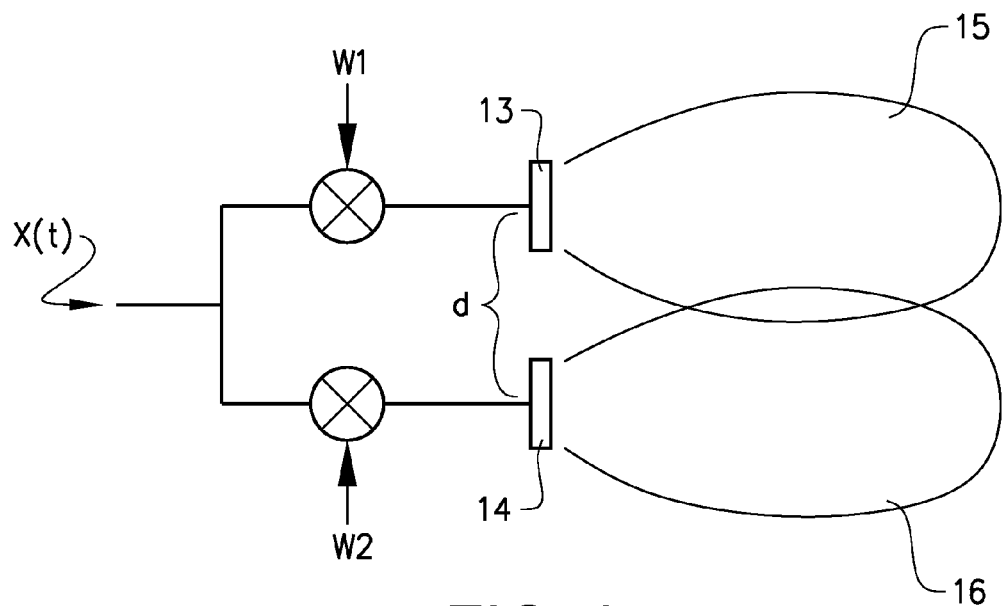
FIG. 2a shows a simplified top view of a first type of antenna arrangement which is arranged to present an angularly varying polarization.
Figure 2B:
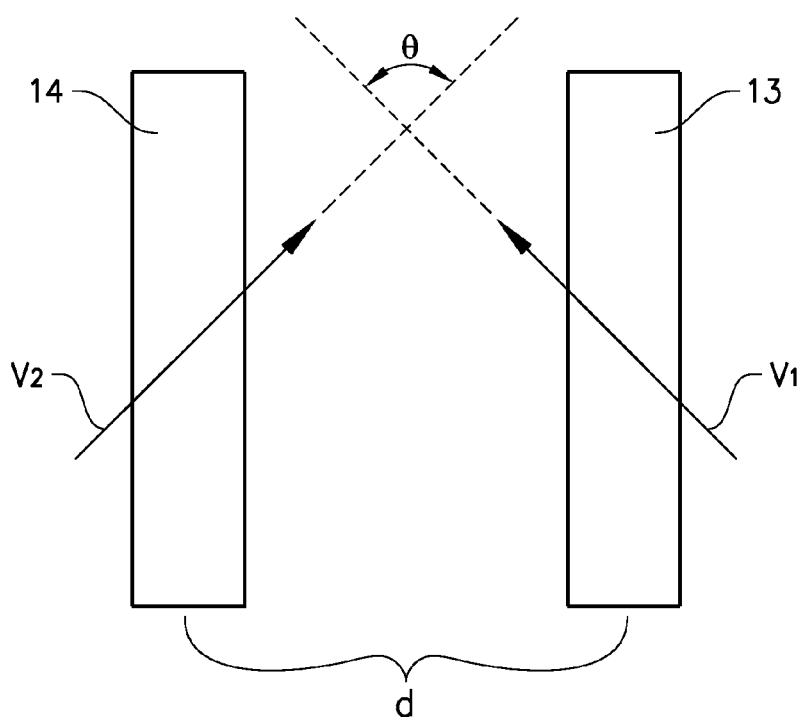
FIG. 2b shows a simplified front view of a first type of antenna arrangement which is arranged to present an angularly varying polarization.

With reference to FIG. 2a and FIG. 2b, in a first version of an antenna A as used in the present invention, it is composed of a first element 13 and a second element 14 with a corresponding first radiation pattern 15 and second radiation pattern 16, the radiation patterns 15, 16 being essentially similar. The first element 13 radiates with a first polarization having a first polarization vector $v_1$ and the second element 14 radiates with a second polarization, having a second polarization vector $v_2$ with an angle θ presented between their extensions. The first polarization vector $v_1$ and the second polarization vector $v_2$ are orthogonal in this example, i.e. the angle θ=90°, but this is not absolutely necessary, some degree of parallelity can be accepted. The two antenna elements 13, 14 are separated by a small distance d.

An incoming time-varying signal x(t) is divided into two signals $x_1(t)$, $x_2(t)$ to the two elements 13, 14, where weights w1, w2 are added to the corresponding signals $x_1(t)$, $x_2(t)$.

The net polarization vector for transmissions in a direction φ will be:

$$p(\varphi) = w_1 g_1(\varphi) v_1 + w_2 g_2(\varphi) v_2 \cdot \exp\left(\frac{2\pi i d}{\lambda} \sin\varphi\right)$$

For simplicity, in this example w1=w2=1 and $g_1(\varphi) = g_2(\varphi) = 1$. Thus, the net polarization vector is an angular-dependent linear combination of the two element polarizations:

$$p(\varphi) = v_1 + v_2 \cdot \exp\left(\frac{2\pi i d}{\lambda} \sin\varphi\right)$$

Figure 3A:
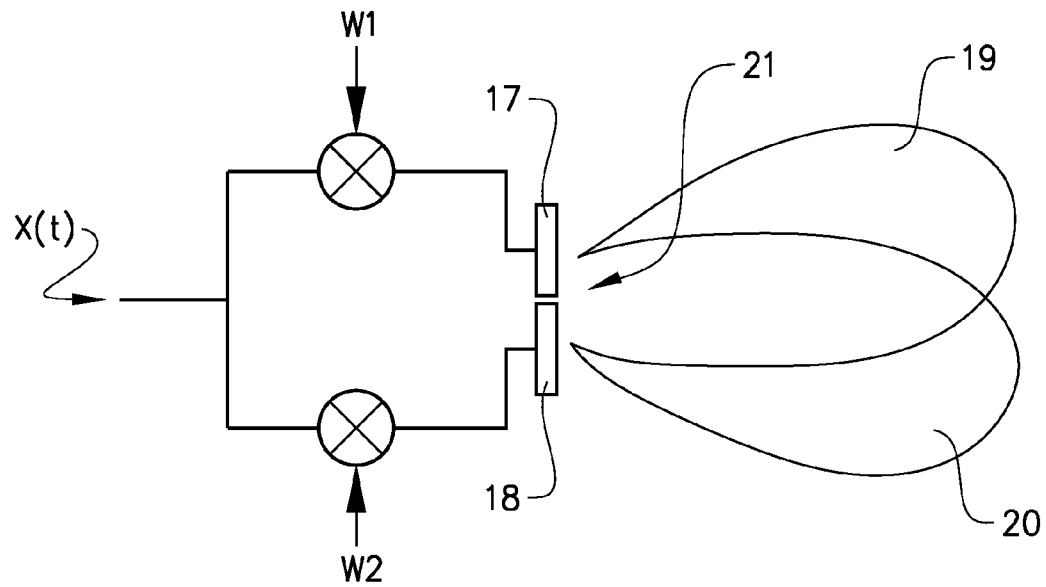
FIG. 3a shows a simplified top view of a second type of antenna arrangement which is arranged to present an angularly varying polarization.
Figure 3B:
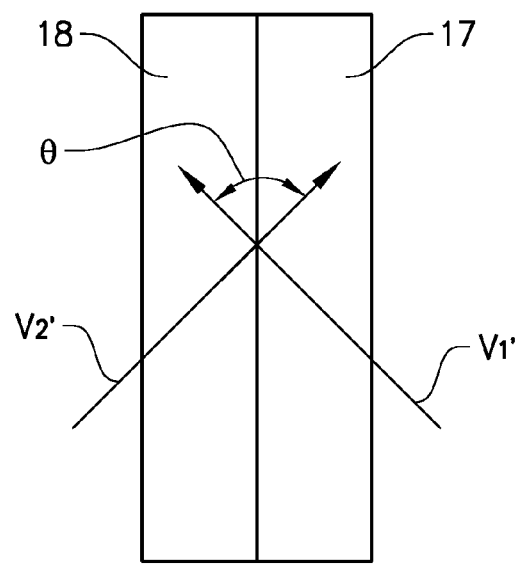
FIG. 3b shows a simplified front view of a second type of antenna arrangement which is arranged to present an angularly varying polarization.

With reference to FIG. 3a and FIG. 3b, in a second version of an antenna A' as used in the present invention, it is composed of a first element 17 and a second element 18 with a corresponding first radiation pattern 19 and second radiation pattern 20, the radiation patterns 19, 20 being dissimilar. The first element 17 radiates with a first polarization having a first polarization vector $v_1'$ and the second element 18 radiates with a second polarization, having a second polarization vector $v_2'$ with an angle θ presented between their extensions. The elements 17, 18 preferably have a common phase centre, although this is not required. The net polarization in any given direction will be a result of a weighted sum of the first polarization vector $v_1'$ and the second polarization vector $v_2'$, An incoming time-varying signal x(t) is divided into two signals $x_1(t)$, $x_2(t)$ to the two elements, where weights w1, w2 are added to the corresponding signals $x_1(t)$, $x_2(t)$. The weights w1, w2 are the antenna gains for the elements in that particular direction. By shaping the radiation patterns of the two elements, it is possible to control how the net polarization will behave.

According to the above, the net polarization vector for transmissions in a direction φ is:

$$p(\varphi) = w_1 g_1(\varphi) v'_1 + w_2 g_2(\varphi) v'_2 \cdot \exp\left(\frac{2\pi i d}{\lambda} \sin\varphi\right)$$

and, without loss of generality, setting d=0, w1=1, w2=1 gives $p(φ)=g_1(φ)v'_1+g_2(φ)v'_2$ In the above example, a three-sector base station is used as an example. Of course, the present invention is applicable for any number of sectors, although the smallest number of sectors is two. The main idea of the present invention is to use the antenna design of, for example, the alternatives described with reference to FIGS. 2a, 2b, 3a and 3b, and create a sector area pattern such that orthogonality between adjacent antenna polarizations is achieved at the sector borders.

The present invention may also be used in order to obtain an enhanced positioning of a user terminal. Today there are a number of passive radio positioning solutions.

DECCA enables passive positioning based on frequency phase difference. Each pair of radio beacons creates a hyperbola, and with three beacons the intersection defines the two dimensional position.

Global Positioning System (GPS) enables positioning by triangulation based on time delay from synchronized satellite radio transmissions of a timing signal. Accuracy is around ±15 meters.

VOR, short for VHF (Very High Frequency) Omni-directional Radio Range, uses the phase relationship between a reference-phase and a rotating-phase signal to encode direction. The reference 30 Hz signal is frequency modulated (FM) on a 9960 Hz sub-carrier. A second 30 Hz signal is derived from the electronic rotation of a directional antenna array 30 times a second. The predictable accuracy of the VOR system is ±1.4°. There is also a similar military system Tactical Air Navigation, called TACAN. It also provides the user with a distance by the Distance Measuring Equipment (DME) system.

One cellular network-based positioning method is CGI+TA (Cell Global Identity+Timing Advance). This system is based on the fact that the system can identify the cell or cell sector surrounding a base station in which the user is located and can use TA to determine the distance between the user and the radio mast. The precision depends on the cell size and is typically 200 or 300 meters in urban environments and several kilometers in rural areas.

Another cellular positioning method is the terminal-based E-OTD (Enhanced Observed Time Difference). It calculates a user's position using signals from three base stations. The phone compares the time it takes for a signal to be received from each of the three base stations and uses measurement equipment called a Location Management Unit (LMU) consisting of the GSM radio, a GPS (Global Positioning System) receiver and the mobile phone and a reference time transmitted by a GPS satellite to calculate the position. The system, which is commercially available in the US, has an accuracy of 50 to 250 meters.

However, there exist drawbacks with the existing system.
GPS and DECCA require reception from 3 transmitters for two dimensional positioning, and GPS from 4 transmitters for three dimensional positioning.
GPS requires accurate synchronized clocks in transmitters.
GPS does not work indoor.
VOR is only two dimensional.
VOR requires two receivers.
CGI+TA is not so accurate.
E-OTD is based on GPS and has the same drawbacks.

With reference to FIG. 1, a user terminal 22 is present in the first sector area 7. The user terminal 22 is equipped with means 23 for determining its position within the sector area 7 by measuring and evaluating the polarization of the signals received from the base station 1. Said position is in the form of an angular position α which is defined within an angular interval 24 between the corresponding borders 10, 12 of the sector area 7.

The angular position α is preferable used in combination with other information from other existing methods to improve the granularity and accuracy of the positioning.

In an embodiment example for positioning, the polarization p(φ) is measured by the user terminal 22. The angular position α can either be compared to a gravity reference or a reference signal. A reference signal can for example be broadcast by a pilot antenna with a fixed polarization. The polarization information gives the transmission direction, the angular position α, which can be used together with the CGI+TA method refining the position information within a cell.

Also, the polarization of neighbouring cells can be measured, further improving the accuracy, or replacing the reference by measuring the difference in polarization.

The polarization information can be reported from the user terminal 22 to the network for network based positioning services such as emergency call positioning. It can also be used in the user terminal 22 for terminal services.

The present invention is not limited to the embodiments described above, but may vary freely within the scope of the appended claims.

The base station is generally constituted by, or comprised in, a node in a wireless communication system.

Other antenna solutions are possible, it is not necessary for the present invention that the antennas that have varying polarizations over the azimuth directions have a continuous variation, but it is also possible with a stepped variation. Polarization variation can be different in different sector areas, and not all sector areas need to have any polarization variation at all.

A node according to the invention may only comprise two antennas, where each antenna covers a corresponding sector, the node thus comprising two sectors. Then each sector area is adjacent to only one other sector area, two adjacent sector areas being separated by at two corresponding borders.

The sectors areas need not be symmetrically disposed, but may cover different angular intervals.

All antennas 4, 5, 6 described may be of any suitable type, for example wire antennas, patch antennas or dipole antennas, generally constituting antenna functions.

The invention claimed is:

1. A node in a wireless communication system, the node having a central point and comprising at least two antenna functions, each antenna function being arranged to cover a corresponding sector area, the sector areas being positioned around the central point successively such that each sector area is adjacent to at least one other sector area, two adjacent sector areas being separated by at least one corresponding border extending from the central point and running between the corresponding antenna functions, wherein the polarization of at least one of said antenna functions, between the borders of the corresponding sector area, varies over the azimuth directions associated with the corresponding sector area such that for each border, the polarizations of the antenna functions at each side of the border are orthogonal at the border.

2. The node according to claim 1, further comprising an odd number of sector areas.

3. The node according to claim 2, further comprising a first antenna function, a second antenna function and a third antenna function, where each antenna function is arranged to cover a corresponding first sector area, second sector area and third sector area.

4. The node according to claim 1, wherein the polarization of each antenna function is continuously variable between the borders of the corresponding sector area, such that the polarization for each antenna function varies equally from one border to the other in the corresponding sector area.

5. The node according to claim 4, wherein each antenna function with a continuously variable polarization comprises a first element with a first polarization vector and a second element with a second polarization vector, the polarization vectors presenting an angle between the first and second polarization vectors, where the elements radiate equal radiation patterns or unequal radiation patterns, the elements being separated by a distance.

6. The node according to claim 5, wherein each one of the elements is fed with the same signal, the signal being weighted by a certain weight for each one of the elements and/or the polarization vectors are orthogonal to each other, such that the angle is 90°.

7. A wireless communication system comprising at least one node, said node having a central point and comprising at least two antenna functions, each antenna function being arranged to cover a corresponding sector area, the sector areas being positioned around the central point successively such that each sector area is adjacent to at least one other sector area, two adjacent sector areas being separated by at least one corresponding border extending from the central point and running between the corresponding antenna functions, wherein polarization of at least one of said antenna functions, between the borders of the corresponding sector area, varies over the azimuth directions associated with the corresponding sector area such that for each border, the polarizations of the antenna functions at each side of the border are orthogonal at the border.

8. The wireless communication system according to claim 7, further comprising an odd number of sector areas.

9. The wireless communication system according to claim 8, further comprising a first antenna function, a second antenna function and a third antenna function, where each antenna function is arranged to cover a corresponding first sector area, second sector area and third sector area.

10. The wireless communication system according to claim 7, wherein the polarization of each antenna function is continuously variable between the borders of the corresponding sector area, such that the polarization for each antenna function varies equally from one border to the other in the corresponding sector area.

11. The wireless communication system according to claim 7, further comprising at least one user terminal in one sector area, the user terminal being equipped with means for determining its angular position within the sector area by measuring and evaluating the polarization of the signals received from said node, the angular position being defined within an angular interval between the corresponding borders, and having a certain accuracy.

12. The wireless communication system according to claim 11, wherein the obtained angular position is used for one or more of:
  improving cellular positioning;
  improving Global Positioning System coverage; and
  obtaining Very High Frequency Omni-directional Radio positioning functionality.

13. An antenna function located in each sector of a wireless communication system, each antenna function being arranged to cover one sector area having at least two borders towards at least one other adjacent sector area, wherein the polarization of the antenna function, between said borders, varies over the azimuth directions associated with the corresponding sector area such that along each border, and wherein the polarization of the antenna function is orthogonal to the polarization in the corresponding adjacent sector area.

14. The antenna function according to claim 13, further comprising a first element with a first polarization vector and a second element with a second polarization vector, the polarization vectors presenting an angle between the first and second polarization vectors, where the elements radiate equal radiation patterns or unequal radiation patterns, the elements being separated by a distance.

* * * * *